Patented Feb. 8, 1949

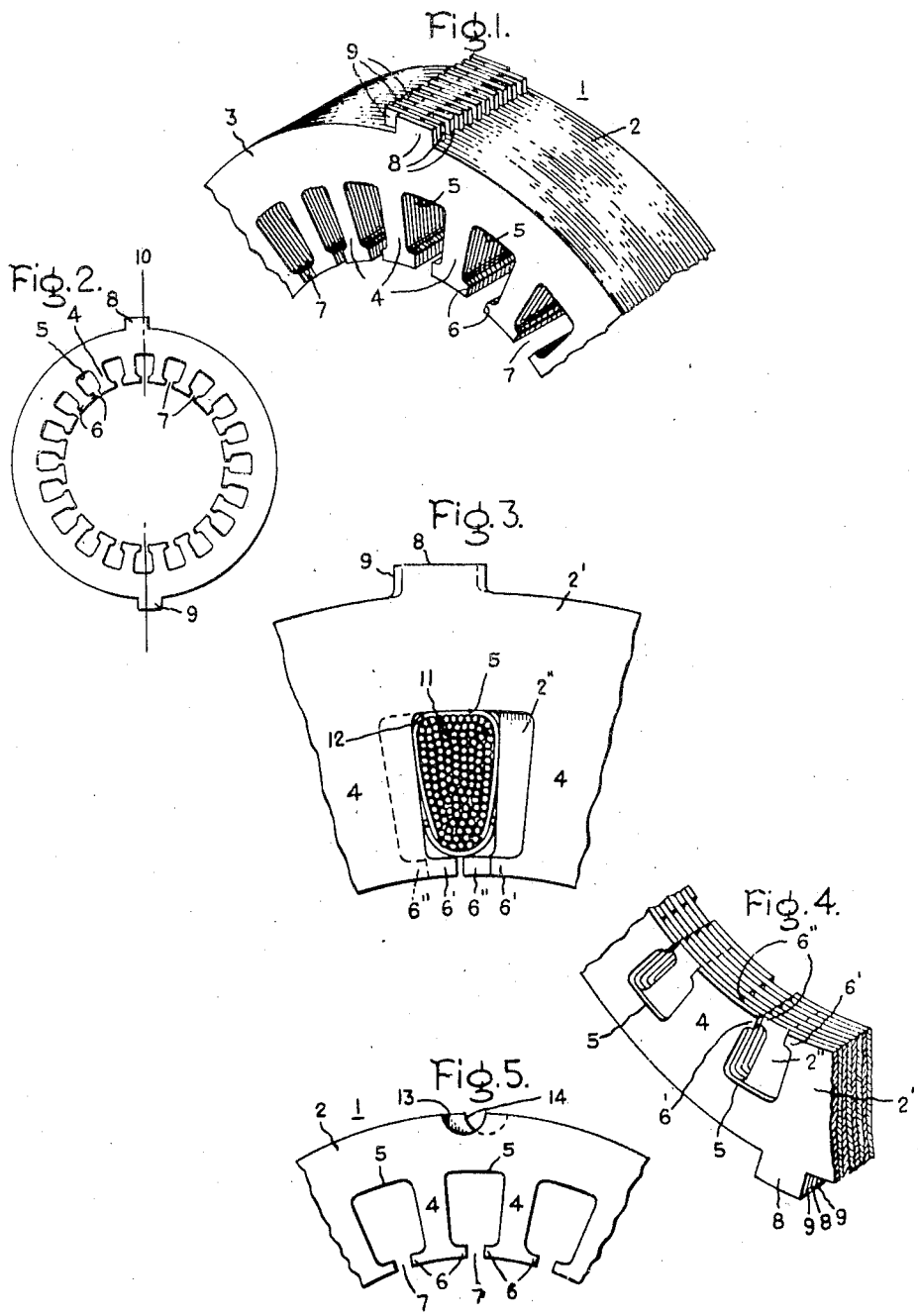

2,461,296

UNITED STATES PATENT OFFICE 2,461,296

DYNAMOELECTRIC MACHINE CORE MEMBER

Arthur Frank Ordas, Huntertown, Ind., assignor to General Electric Company, a corporation of New York Application April 1, 1948, Serial No. 18,446

9 Claims. (Cl. 171—252)

This invention relates to magnetizable core members for dynamoelectric machines and more particularly to stator members having slots for distributed windings.

In the design of alternating current dynamoelectric machines, particularly induction motors and generators having coil-containing slots, it is desirable to have the inner surface of the stator present, as nearly as possible, an unbroken area of magnetic material. This produces a uniform distribution of flux, decreases the reluctance of the air gap, and also decreases the magnetizing current of the winding. In the case of an induction motor, there is a pulsation loss present in a stator with open slots caused by the variation of the flux through the stator teeth as the rotor teeth pass. This pulsation of flux in the stator teeth has a frequency which is the number of rotor teeth times the revolutions per second of the rotor. It can easily be seen that these frequencies may be on the order of 1,000 cycles per second and, therefore, the loss due to these pulsations, will be large. This tooth pulsation loss is also reduced to a minimum when the reluctance of the air gap is constant. Furthermore, the increased reactance provided by a closed slot construction in an induction motor causes an accompanying reduction in starting current. In the case of a generator, a more uniform sine wave is obtained with a continuous inner stator surface.

The advantages of a closed slot construction can be obtained by initially punching the laminations with bridges between the teeth to form a continuous inner periphery. However, this construction necessitates drawing the windings through the slots and adds appreciably to the cost of assembly. It is well known in the art to use stator slot openings of maximum width which facilitates positioning of the windings in the slots and then to close the slots after the windings are in place with a wedge of magnetic material. However, with this construction, the wedges must be individually driven into each slot and these wedges frequently become loose causing undesirable vibration and hum. Furthermore, with either a completely closed slot or wedge-closure construction, the leakage reactance between the teeth is increased.

An object of this invention is the provision of an improved magnetizable core member for a dynamoelectric machine.

Another object of this invention is to provide an improved stator member for a dynamoelectric machine wherein the slot openings are initially wide for ease in winding and may be thereafter closed to provide characteristics of a closed slot construction.

A further object of this invention is to provide an improved stator member wherein the width of the slot opening may be controlled.

Further objects and advantages of this construction will become apparent and the invention will be better understood by reference to the following description and the accompanying drawing. The features of novelty which characterize this invention will be pointed out with particularity in the claims annexed to and forming a part of this specification.

In accordance with this invention, there is provided a magnetizable core member for a dynamoelectric machine composed of a plurality of laminations. These laminations are provided with teeth and comparatively wide slot openings therebetween which when aligned, facilitate assembly of the windings therein. Each lamination is also provided with a tab or groove on its periphery. The tabs or grooves of alternate laminations are initially out of line when the slot openings are aligned. After the windings have been emplaced, the tabs or grooves are aligned causing alternate teeth to be out of line, thereby effectively closing the slot openings a predetermined amount.

In the drawing, Fig. 1 is an illustration, in perspective, of a portion of a dynamoelectric machine stator embodying this invention with the slot openings aligned prior to winding; Fig. 2 shows a single lamination of the embodiment of Fig. 1; Fig. 3 is a side elevational view of the embodiment of Fig. 1 showing the slot openings partially closed; Fig. 4 is another view in perspective of the embodiment of Fig. 1 showing the slot openings completely closed; and Fig. 5 is a side elevational view illustrating another embodiment of this invention.

Referring now to Fig. 1, there is shown a portion of a magnetizable core or stator member for a dynamoelectric machine generally identified as 1. This stator member is composed of a plurality of relatively thin laminations 2 of magnetizable material and has a yoke section 3 with a plurality of teeth 4 extending radially inward therefrom. The teeth 4 define winding slots 5 therebetween and are provided with tips 6 which define slot openings 7 therebetween. In the initial assembly of the laminations 2, the teeth 4 are aligned in the axial direction thereby providing the maximum width of the winding slots 5 and the slot openings 7.

Referring now to Fig. 2, there is shown a side elevational view of one of the stampings which form the laminations 2. This stamping is provided with two projections or tabs 8 and 9 on its outer periphery, these tabs being offset respectively from the diameter of the punching, as shown by the line 10. Referring again to Fig. 1, the laminations 2 are initially assembled with alternate punchings turned over. Therefore, when the teeth 4 are aligned axially thereby providing alignment and maximum width of the slots 5 and slot openings 7, the tabs 8 will adjoin the tabs 9 with the tabs of alternate punchings out of line. The stator member is now ready for positioning of the windings in the slots 5.

Referring now to Fig. 3, there is shown a portion of the stator of Fig. 1 with windings 11 positioned in the slot 5. Insulating slot lining material 12 is used to protect the windings 11 from injury due to contact with the laminations. In order to colse the slot openings 7, which were initially wide to permit ease of assembly of the windings 11, the tabs 8 and 9 are pressed together a predetermined amount by suitable means, thus rotating alternate punchings respectively, so that the tabs are more nearly in alignment. As shown in Fig. 3, the opening between the tips 6' of the teeth 4 of punching 2' remains the same as the opening between tips 6'' of the punching 2''. However, with the tabs 8 and 9 brought more nearly in alignment the tip 6'' now nearly closes the opening of the slot 5.

Referring now to Fig. 4, there is shown a perspective view illustrating the appearance of the inner periphery of the stator of Fig. 1 with the tabs in complete alignment and the slot openings completely closed. It can be readily seen from Figs. 3 and 4 that the effective width of the slots 5 is decreased. However, by appropriate design the windings 11 can be made to completely fill the slots after the tabs have been aligned. While Fig. 2 shows two aligning tabs, it may be desirable to provide a larger number around the periphery of the stator in order to give the structure the necessary strength. Furthermore, it may also be desirable to provide an auxiliary set of tabs which are out of line when the main tabs are in alignment and the slots are closed. This would permit reopening the slots by pressing the auxiliary tabs together and thus facilitate removal and replacement of the windings.

Referring now to Fig. 5, in which like parts are designated by like numerals, there is shown another embodiment of this invention in which the stator 1 is provided with a plurality of laminations 2 with teeth 4 projecting radially inward therefrom. The teeth 4 define winding slots 5 and are provided with tips 6 which define slot openings 7. Instead of the tabs 8 and 9 of the embodiment of Fig. 1, notches or grooves 13 and 14 are punched or otherwise formed in the outer periphery of the laminations. When the laminations are assembled with the teeth 4 in alignment prior to winding, grooves 13 and 14 are out of line as shown. After the windings have been positioned in the slots 5, the grooves 13 and 14 are brought into alignment, thereby closing the slots in a manner similar to the embodiment of Fig. 1.

After the tabs 8 and 9, or grooves 13 and 14 have been brought into alignment thereby closing the slot openings 7 a predetermined amount, the laminations can be secured together by welding or other suitable mechanical means.

It will now be readily seen that this invention provides a stator construction wherein the slot openings can be held wide for ease in winding and then closed to provide low pole face loss. Furthermore, this invention provides means for controlling the width of the slot opening, i. e., the slots can be partially closed as in Fig. 3, or completely closed as in Fig. 4. Therefore, it is possible to control the characteristics of the machine by varying the width of the resultant slot openings. In addition, since the slot openings are closed by laminations, the leakage reactance is lower than it would be with a solid magnetic wedge. Since the width of the slot openings can be controlled the desirable features of completely closed slot openings can be balanced against the leakage reactance to obtain the optimum desired characteristics. The utilization of a continuous inner stator surface, as provided by this invention, also reduces noise caused by vibration of the tooth laminations due to the changing flux; reduces the telephone interference factor through reduction of slot harmonics; and eliminates the locking tendency present in open slot construction.

While the tabs or grooves of this invention are shown located on the outer periphery of a stator member, it can be readily seeen that this invention can be applied to a rotating member with the aligning means located on the inner periphery. Furthermore, it may be desirable, instead of providing a structure as shown with alternate tabs initially out of line, to arrange the tabs in groups, for instance, with the tabs of the first ten laminations in line and the tabs of the next ten laminations also in line, but out of line with respect to the first group.

While I have illustrated and described certain embodiments of this invention, modifications thereof will appear to those skilled in the art. I desire it to be understood therefore, that this invention is not limited to the embodiments shown and I intend in the appended claims to cover all modifications which do not depart from the spirit and scope of this invention.

What I claim as new and desire to secure by Letters Patent of the United States is:

1. In a dynamoelectric machine, a magnetizable core member composed of a plurality of laminations, said laminations having a plurality of teeth defining winding slots therebetween, said teeth when aligned presenting openings for said slots whereby windings may be positioned therein, and aligning means on said laminations, said means being out of line when said teeth are aligned, said means being adapted to be aligned for causing said teeth to be out of line whereby said slot openings are closed a predetermined amount after said windings are emplaced.

2. In a dynamoelectric machine, a magnetizable core member composed of a plurality of laminations, said laminations having a plurality of teeth defining winding slots therebetween, said teeth when aligned presenting openings for said slots whereby windings may be positioned therein, and aligning means on each of said laminations, the means on alternate laminations being out of line when said teeth are aligned, said means being adapted to be aligned for causing alternate teeth to be out of line whereby said slot openings are closed a predetermined amount after said windings are emplaced.

3. A stator member for a dynamoelectric machine having a plurality of laminations, said laminations having a plurality of teeth extending radially inward therefrom and defining winding slots therebetween, said teeth when aligned presenting openings for said slots whereby windings may be positioned therein, and aligning means on the outer periphery of each of said laminations, the means on alternate laminations being out of line when said teeth are aligned, said means being adapted to be aligned for causing alternate teeth to be out of line whereby said slot openings are closed a predetermined amount after said windings are emplaced.

4. In a dynamoelectric machine, a magnetizable core member composed of a plurality of laminations said laminations having a plurality of teeth defining winding slots therebetween, said teeth when aligned presenting openings for said slots whereby windings may be positioned therein, and projections on said laminations, some of said projections being out of line with respect to other projections when said teeth are aligned, said projections being adapted to be aligned for causing said teeth to be out of line whereby said slot openings are closed a predetermined amount after said windings are emplaced.

5. In a dynamoelectric machine, a magnetizable core member composed of a plurality of laminations, said laminations having a plurality of teeth defining winding slots therebetween, said teeth when aligned presenting openings for said slots whereby windings may be positioned therein, and a projection on each of said laminations, the projections of alternate laminations being out of line when said teeth are aligned, said projections being adapted to be aligned for causing alternate teeth to be out of line whereby said slot openings are closed a predetermined amount after said windings are emplaced.

6. A stator member for a dynamoelectric machine having a plurality of laminations, said laminations having a plurality of teeth extending radially inward therefrom and defining winding slots therebetween, said teeth when aligned presenting openings for said slots whereby windings may be positioned therein, and a projection on the outer periphery of each of said laminations, the projections of alternate laminations being out of line when said teeth are aligned, said projections being adapted to be aligned for causing alternate teeth to be out of line whereby said slot openings are closed a predetermined amount after said windings are emplaced.

7. In a dynamoelectric machine, a magnetizable core member composed of a plurality of laminations, said laminations having a plurality of teeth defining winding slots therebetween, said teeth when aligned presenting openings for said slots whereby windings may be positioned therein, and grooves in said laminations, some of said grooves being out of line with respect to other grooves when said teeth are aligned, said grooves being adapted to be aligned for causing said teeth to be out of line whereby said slot openings are closed a predetermined amount after said windings are emplaced.

8. In a dynamoelectric machine, a magnetizable core member composed of a plurality of laminations, said laminations having a plurality of teeth defining winding slots therebetween, said teeth when aligned presenting openings for said slots whereby windings may be positioned therein, and a groove in each of said laminations, the grooves of alternate laminations being out of line when said teeth are aligned, said grooves being adapted to be aligned for causing alternate teeth to be out of line whereby said slot openings are closed a predetermined amount after said windings are emplaced.

9. A stator member for a dynamoelectric machine having a plurality of laminations, said laminations having a plurality of teeth extending radially inward therefrom and defining winding slots therebetween, said teeth when aligned presenting openings for said slots whereby windings may be positioned therein, and a groove in the outer periphery of each of said laminations, the grooves of alternate laminations being out of line when said teeth are aligned, said grooves being adapted to be aligned for causing alternate teeth to be out of line whereby said slot openings are closed a predetermined amount after said windings are emplaced.

ARTHUR FRANK ORDAS.

No references cited.